United States Patent
Koch

(10) Patent No.: US 10,817,681 B2
(45) Date of Patent: *Oct. 27, 2020

(54) METHOD AND APPARATUS FOR IMPROVING RADIO FREQUENCY IDENTIFICATION COVERAGE

(71) Applicant: SYMBOL TECHNOLOGIES, LLC, Lincolnshire, IL (US)

(72) Inventor: Michael J. Koch, Fort Salonga, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,567

(22) Filed: May 6, 2019

(65) Prior Publication Data

US 2019/0272397 A1    Sep. 5, 2019

Related U.S. Application Data

(63) Continuation of application No. 15/628,211, filed on Jun. 20, 2017, now Pat. No. 10,282,575, which is a (Continued)

(51) Int. Cl.
*G06K 7/10* (2006.01)
*H01Q 1/22* (2006.01)
(Continued)

(52) U.S. Cl.
CPC ....... *G06K 7/10356* (2013.01); *H01Q 1/2216* (2013.01); *H01Q 3/247* (2013.01);
(Continued)

(58) Field of Classification Search
CPC combination set(s) only.
See application file for complete search history.

(56) References Cited

U.S. PATENT DOCUMENTS

| 4,943,811 A * | 7/1990 | Alden | ................... H01Q 1/248 343/814 |
|---|---|---|---|
| 7,806,333 B1 | 10/2010 | McReynolds et al. | |

(Continued)

FOREIGN PATENT DOCUMENTS

| EP | 1619750 A1 | 1/2006 |
|---|---|---|
| EP | 1967983 A2 | 9/2008 |

(Continued)

OTHER PUBLICATIONS

International Search Report and Written Opinion for International Patent Application No. PCT/US2012/069112 dated Feb. 1, 2013.

*Primary Examiner* — An T Nguyen
(74) *Attorney, Agent, or Firm* — Yuri Astvatsaturov

(57) ABSTRACT

A method and apparatus are disclosed for improving RFID coverage using an antenna array having an adaptive antenna beam. The apparatus includes an RFID reader including an antenna array having a plurality of antenna elements. Subsets of the plurality of antenna elements are selectively activating in order to direct an antenna beam to communicate with at least one RFID tag. The method includes transmitting an interrogation signal from an antenna array by activating one or more subsets of a plurality of antenna elements forming the antenna array. In this way, the interrogation signal is directed thereby improving antenna coverage.

17 Claims, 10 Drawing Sheets

Related U.S. Application Data continuation of application No. 13/329,438, filed on Dec. 19, 2011, now Pat. No. 9,715,608.

(51) Int. Cl.

| | | |
|---|---|---|
| *H04B 7/04* | (2017.01) | |
| *H04B 7/06* | (2006.01) | |
| *H01Q 3/24* | (2006.01) | |
| *H01Q 3/26* | (2006.01) | |
| *H04B 7/10* | (2017.01) | |

(52) U.S. Cl.
CPC ............. *H04B 7/04* (2013.01); *H04B 7/0617* (2013.01); *H01Q 3/26* (2013.01); *H04B 7/0691* (2013.01); *H04B 7/0695* (2013.01); *H04B 7/10* (2013.01)

(56) References Cited

U.S. PATENT DOCUMENTS

| | | | |
|---|---|---|---|
| 7,973,645 B1 | 7/2011 | Moretti et al. | |
| 2004/0227682 A1 | 11/2004 | Anderson | |
| 2006/0152426 A1* | 7/2006 | McGrath | H01Q 1/38 343/770 |
| 2007/0040687 A1* | 2/2007 | Reynolds | G06K 7/10356 340/572.7 |
| 2007/0040689 A1* | 2/2007 | Reynolds | G06K 7/10356 340/572.7 |
| 2008/0075146 A1* | 3/2008 | Rofougaran | H01Q 3/22 375/135 |
| 2008/0122723 A1* | 5/2008 | Rofougaran | H01Q 9/145 343/861 |
| 2008/0150799 A1* | 6/2008 | Hemmi | H01Q 13/085 342/361 |
| 2009/0149136 A1* | 6/2009 | Rofougaran | H03H 7/38 455/77 |
| 2010/0109873 A1 | 5/2010 | Derose et al. | |
| 2010/0277394 A1* | 11/2010 | Haustein | H01Q 21/24 343/876 |
| 2010/0297947 A1* | 11/2010 | Rofougaran | H04B 7/0682 455/63.1 |
| 2010/0297957 A1* | 11/2010 | Rofougaran | H04B 7/0689 455/77 |
| 2011/0028103 A1* | 2/2011 | Rofougaran | H01Q 1/2291 455/77 |
| 2013/0154803 A1* | 6/2013 | Koch | H04B 7/04 340/10.1 |
| 2017/0293780 A1* | 10/2017 | Koch | G06K 7/10356 |

FOREIGN PATENT DOCUMENTS

| | | |
|---|---|---|
| EP | 2320349 A2 | 5/2011 |
| GB | 2426407 A | 11/2006 |
| GB | 2440790 A | 2/2008 |

\* cited by examiner

METHOD AND APPARATUS FOR IMPROVING RADIO FREQUENCY IDENTIFICATION COVERAGE

CROSS-REFERENCE TO RELATED APPLICATION

This application is a continuation of U.S. patent application Ser. No. 15/628,211, filed on Jun. 20, 2017, which is a continuation of U.S. patent application Ser. No. 13/329,438, filed on Dec. 19, 2011, both of which are incorporated herein by reference in their entirety.

FIELD OF THE DISCLOSURE

The present disclosure relates generally to antenna arrays, and more particularly to antenna arrays having an adaptive (steerable) antenna beam that may be employed to improve coverage in a radio frequency identification (RFID) system.

BACKGROUND

RFID technology allows identification data to be collected remotely, which provides a significant advantage in identifying articles, parcels or other items. To access identification data stored in an RFID transponder (commonly referred to as a "RFID tag" or "tag"), an RFID reader/encoder generates an energy field via a transmission beam to interrogate the RFID tag, and subsequently, to retrieve data stored in the RFID tag. The data received from the RFID tag is processed by a computer system to identify the item that is associated with the RFID tag. Due to its convenience and reliability, RFID technology has found a wide range of applications, including item tracking, item location, inventory assessment, etc.

However, complications may occur in the detection of RFID tags in monitored areas where the dimensions of the monitored area present RFID coverage challenges. To attempt to overcome these challenges, conventional RFID reader systems employ multiple RFID readers placed about the monitored area. Nevertheless, detection challenges persist due to the fixed transmission beams of the stationary RFID readers and to multipath which causes fluctuations and areas of weak signal strength in the monitored area. Moreover, if the items are randomly placed and oriented within the monitored area, the RFID tags (and the respective antennas) will be randomly oriented with respect to the fixed RFID readers. Random orientation may result in a weak responsive signal from the RFID tag and also promote polarization errors and other deficiencies in the signals returned from the RFID tag(s).

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
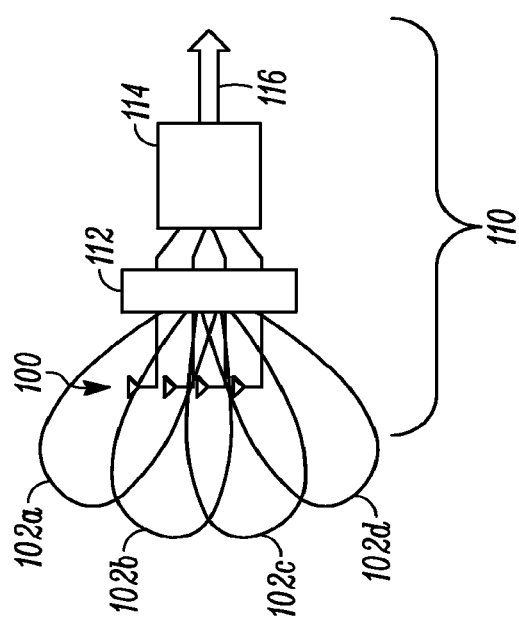
FIG. 1 is a block diagram of an antenna array having an adaptive antenna beam and a plurality of items having RFID tags in accordance with some embodiments.
Figure 1:
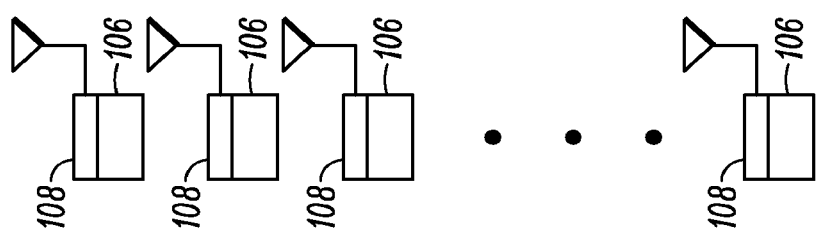

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Techniques are disclosed for improving RFID coverage using an antenna array having an adaptive antenna beam. An RFID reader includes an antenna array having a plurality of antenna elements that may be selectively activated in one or more subsets in order to direct an antenna beam to communicate with at least one RFID tag. In this way, the properties of the transmitted signal are changed whereby coverage is improved in monitored areas that are subject to multipath propagation effects.

FIG. 1 is a block diagram of an antenna array 100 having an adaptive antenna beam 102 a-102 d and a plurality of items 106, each item 106 having an RFID tag 108 fixed or otherwise associated thereto. It will be appreciated that while four antenna beams 102 a-102 d are illustrated in FIG. 1, that any number of antenna beams may be formed depending upon the size of the array and the number and location of activated antenna elements. In accordance with various embodiments of the present disclosure, each of the RFID tags 108 may be either an active tag, i.e., a tag which has a self contained power supply or, as is more usually the case, may be a passive tag that requires external excitation when it is to be read or interrogated within a monitored area of an RFID reader 110. In one implementation, the RFID reader 110 includes the antenna array 100, one or more transmit/receive (T/R) modules 112 and a beam forming processor 114, which in some embodiments may be realized as a digital signal processor (DSP) 114. In a multi-reader implementation, each RFID reader 110 communicates with a system controller (not shown in FIG. 1) via a link or bus 116. As illustrated in FIG. 1, the antenna array 100 of the RFID reader 110 has an adaptive (or steerable) antenna beam 102 a-102 d. This allows the transmit power or focus of the receiver to be directed toward a particular area within the monitored area to interrogate one or more RFID tags 108. Again, although FIG. 1 illustrates four distinct antenna beams 102 a-102 d, it will be appreciated that many more antenna beams may be utilized in any particular implementation of the antenna array 100.

Figure 2:
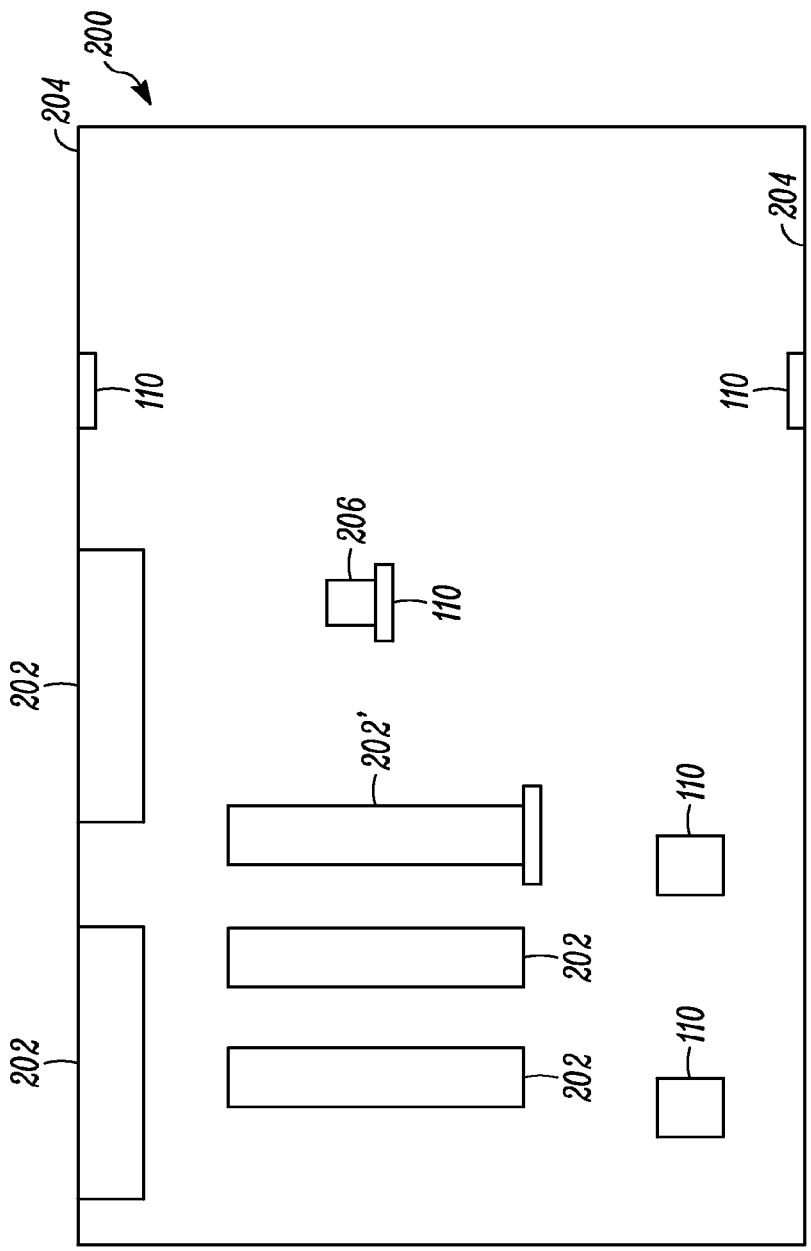
FIG. 2 is a top plan view of a monitored area in accordance with some embodiments.

FIG. 2 is a top plan view of a monitored area 200 in accordance with some embodiments. Within the monitored area 200, several RFID readers 110 with their respective antenna arrays 100 may be positioned to provide adequate coverage to be able to interrogate RFID tags anywhere within the monitored area 200, such as, for example, on shelving 202. Generally, the RFID readers 110 (with their respective antenna arrays 100) may be positioned anywhere within the monitored area, including without limitation, on a shelving unit 202', on a wall 204, on a support post 206 or configured on the ceiling (which is transparent in FIG. 2) of the monitored area 200.

Figure 3:
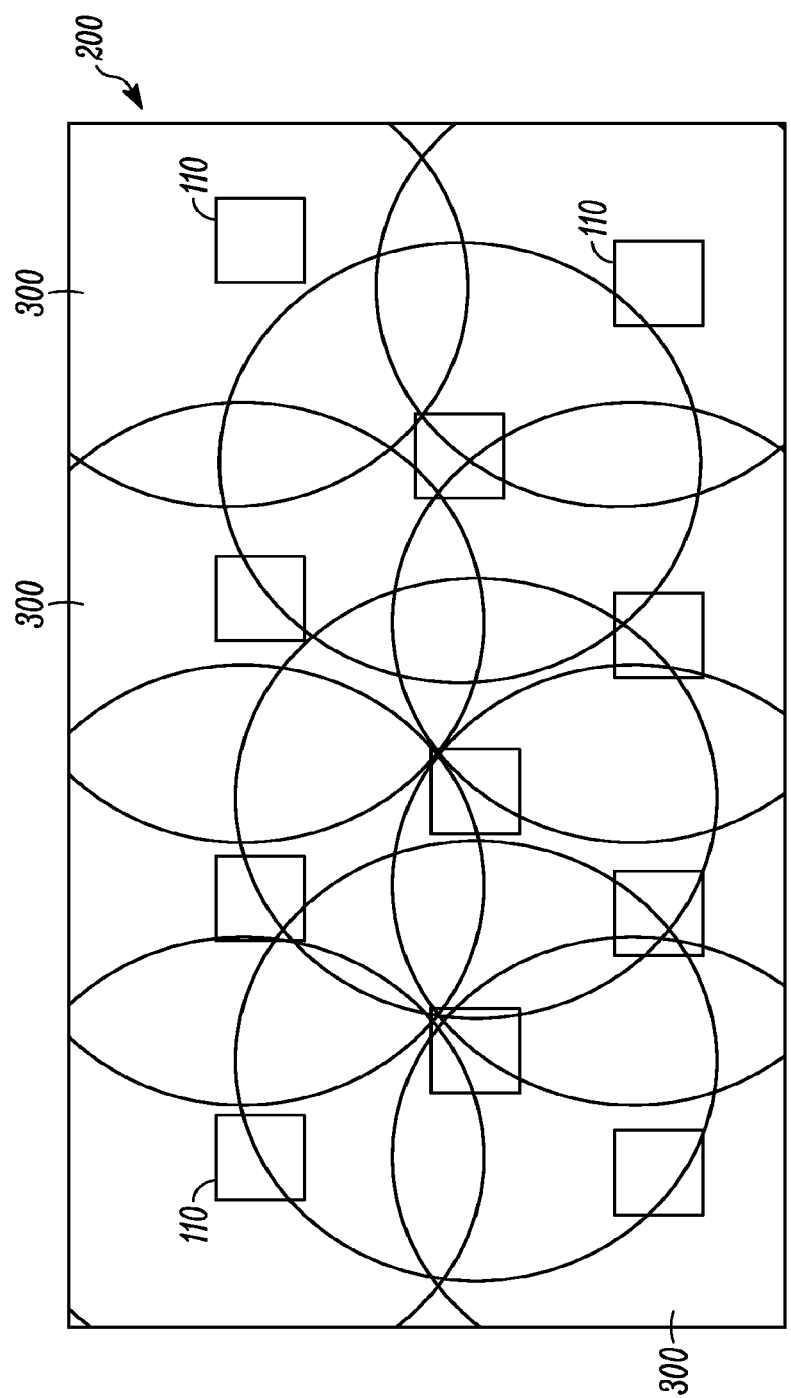
FIG. 3 is a top plan view of the monitored area of FIG. 2 illustrating the RFID coverage from a plurality of ceiling mounted RFID readers in accordance with some embodiments.

FIG. 3 is a top plan view of the monitored area 200 of FIG. 2 illustrating the RFID coverage from a plurality of ceiling mounted RFID readers 110 in accordance with some embodiments. As can be seen, each RFID reader 110 has a coverage area 300 within which an antenna beam may be directed (see FIG. 1) to interrogate and receive responsive signals from one or more RFID tags (not shown in FIG. 3). Typically, the coverage areas 300 overlap to some extent, which presents options for interrogating the RFID tags from one or more RFID readers 110. In this way, the overlapping RFID coverage area and adaptable antenna beams afford the RFID system of the present disclosure a more efficient and reliable opportunity to read the RFID tags within the monitored area 200.

Figure 4:
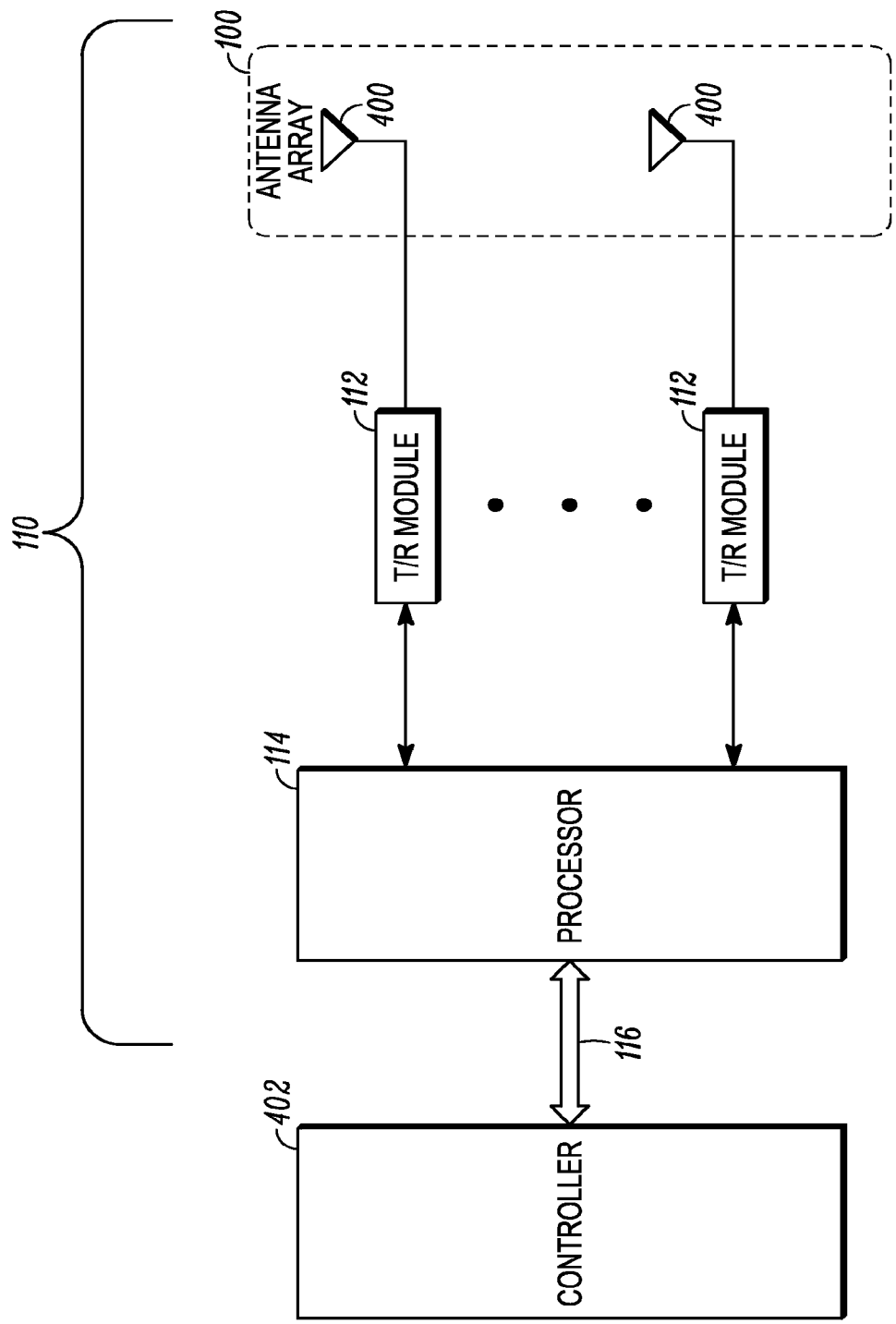
FIG. 4 is a functional block diagram of an RFID reader in accordance with some embodiments.

FIG. 4 is a functional block diagram of an RFID reader 110 in accordance with some embodiments. As noted above, the RFID reader 110 includes the antenna array 100 that includes a number of antenna elements 400 configured in some array pattern. In the illustrated embodiment, each antenna element 400 is coupled to a respective T/R module 112, which in turn, is coupled to a beam forming processor 114, which may be a DSP. For other embodiments, it will be appreciated that the T/R modules need not have a one-to-one correspondence to the number of antenna elements. Each RFID reader 110 communicates (in a multi-reader system environment) via bus 116 with a system controller 402, which may direct any particular RFID reader to transmit an interrogation signal to one or more RFID tags and receive a responsive signal from the RFID tag. That is, a single RFID reader 110 may be instructed by the controller 402 to transmit a signal to and receive a signal from an RFID tag, or one or more RFID readers 110 may receive commands from the controller 402 to transmit a signal to and receive a signal from the same RFID tag(s).

Figure 5:
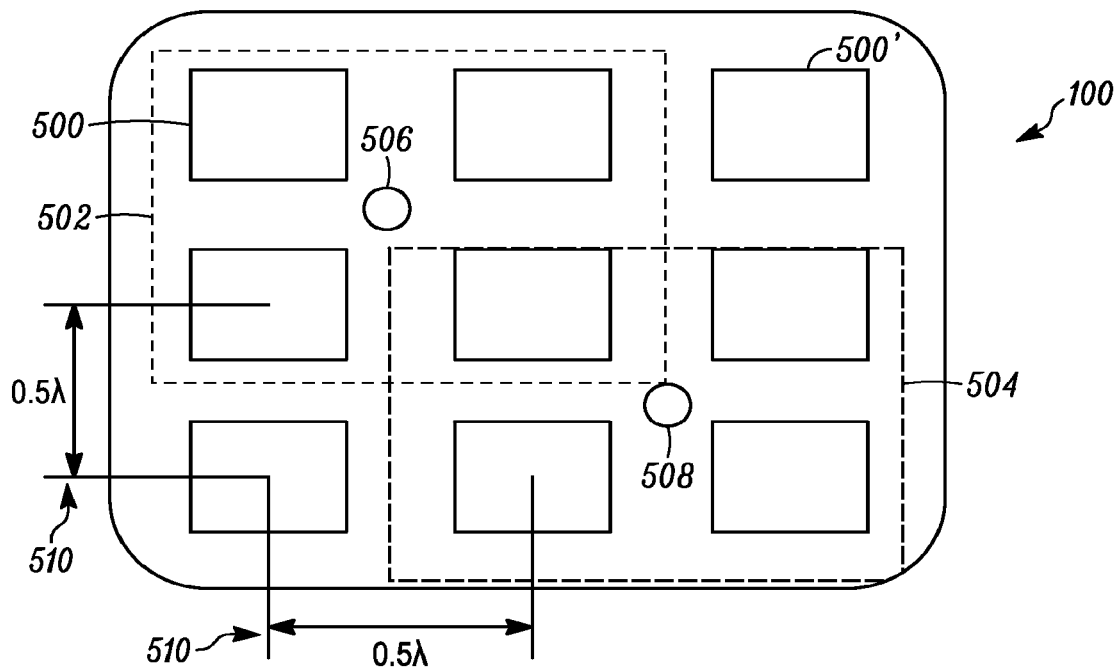
FIGS. 5-13 are illustrations of various antenna array configurations in accordance with some embodiments.

FIG. 5 is an illustration of an antenna array 100 in accordance with some embodiments. The illustrated antenna array 100 includes nine antenna elements 500 arranged in a 3×3 array, however, it will be appreciated that any array configuration may be employed following the teachings of the present disclosure. The antenna elements may be realized in any of a number of antenna types (e.g., loop, dipole, monopole, patch or helix), and FIG. 5 presents the antenna elements as patch antennas. As will be appreciated, patch antennas may be driven (activated) in a vertical polarization, horizontal polarization or circular polarization. Also, a patch antenna may be realized as a dual-port (or dual element) antenna element that may be activated in a horizontal or vertical polarization (for example) depending upon the activation source.

According to various embodiments of the present disclosure, various subsets of the antenna elements 500 of the antenna array 100 are activated to direct (or steer) the antenna beam of the antenna array 100 within the coverage area (300 in FIG. 3). In the example illustrated in FIG. 5, a first subset 502 may be utilized forming a square configuration to transmit an interrogation signal to an RFID tag and then to receive the responsive signal. It will be appreciated that wireless communication is often impaired by the nature of the coverage area. One example is the impairment caused by the multiple paths that RF signals travel between the RFID reader and tag antenna. Often the multiple paths create destructive interference, causing the poor signal strength over portions of the coverage area in areas that would ordinarily be within range (as determined by the transmit power, distance between antennas, reader antenna gain, and tag antenna gain). By varying the selection of antenna element subsets, the antenna beam transmission properties (e.g., gain) will vary. Accordingly, should the responsive signal from the RFID tag have poor signal strength or quality using all antenna elements of the antenna array 100, a subset of antenna elements may be employed to transmit the interrogation signal and/or receive the responsive signal from the RFID tag, which may yield a responsive signal from the RFID tag having a better signal strength or quality. Since the beam centers are the geographic centers of the activated antenna elements 500, the various antenna beams will also be shifted in phase. In this manner of selecting the full set of antenna elements or subsets of antenna elements, the transmission properties will change due to the varying gain and beam centers, and the destructive effects of multipath propogation are reduced or eliminated. Alternately, the first subset 502 may be used to transmit an interrogation signal to the RFID tag, and the second subset 504 may be employed to receive the responsive signal from the RFID tag. The variety of possible subsets together with the polarization options noted above, offers a myriad of antenna beam and polarization combinations providing a versatile approach to interrogating and reading RFID tags within a monitored area (200 of FIG. 3).

Figure 6:
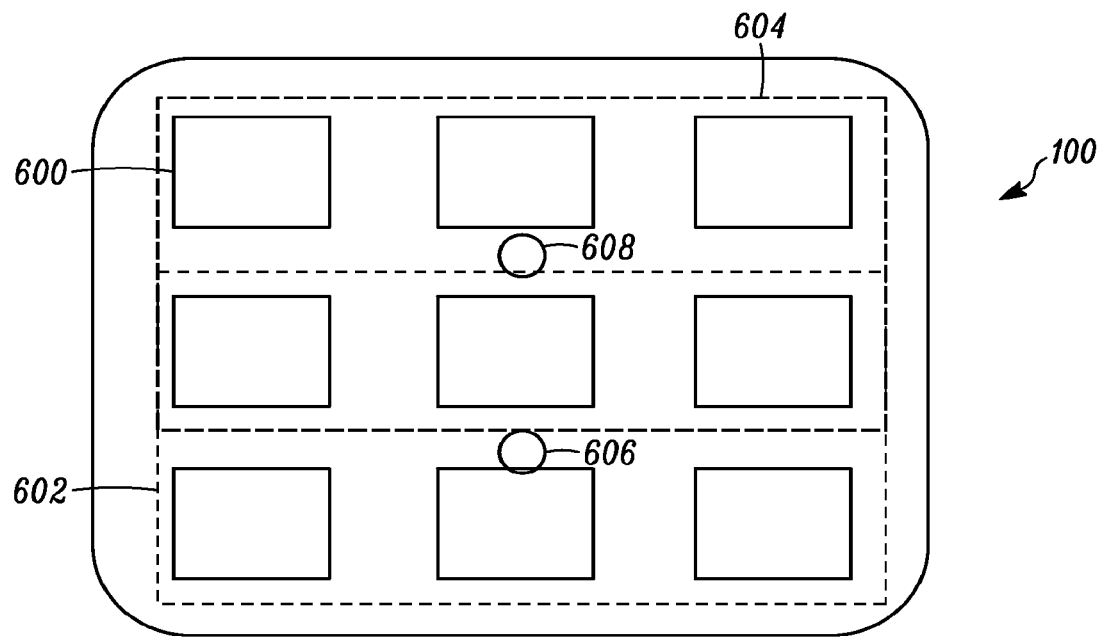

FIG. 6 is another illustration of an antenna array 100 in accordance with some embodiments. As shown in FIG. 6, a first subset 602 of six antenna elements 600 in a rectangular array may be used for transmission and/or reception. Using this subset provides a beam center 606 and an antenna beam with properties that differ from the beam formed using the full set of antenna elements or other subset of antenna elements. Additionally or alternately, a second subset 604 may be used (providing beam center 608). It will be appreciated that in FIG. 6, all of the antenna elements are collectively activated between the subsets 602 and 604, while in FIG. 5, some antenna elements 500' were not activated for the exemplary transmission/reception session. Alternately, the antenna elements 600 of FIG. 6 could be arranged as three subsets of 1×3 rectangular arrays (arranged vertically or horizontally), which would produce a beam center at the center of the middle subset antenna element and transmission properties commensurate with a 1×3 geometry.

Figure 7:
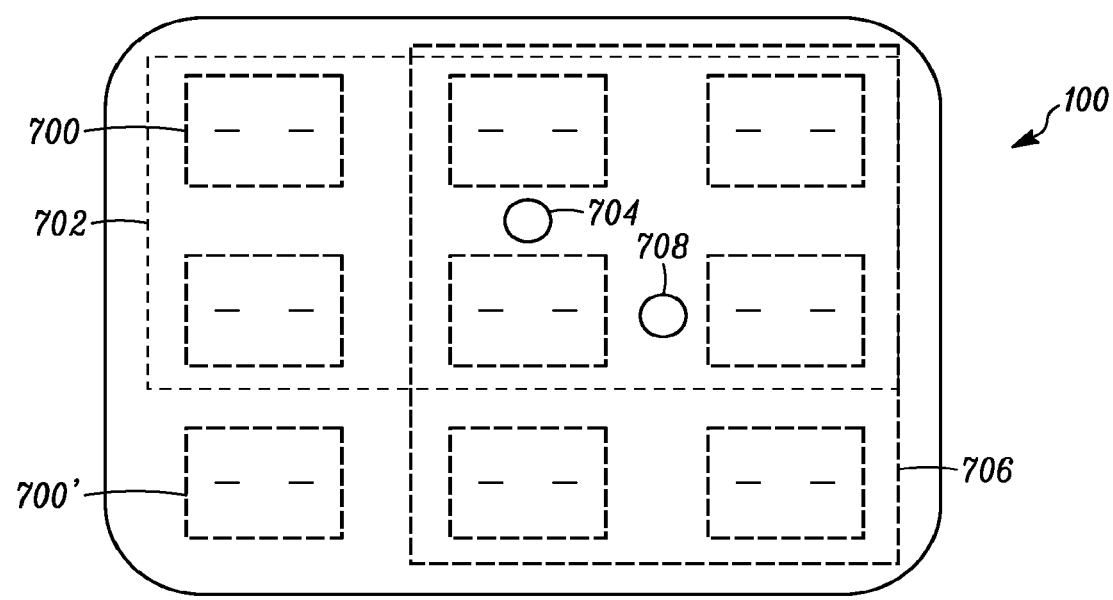
Figure 8:
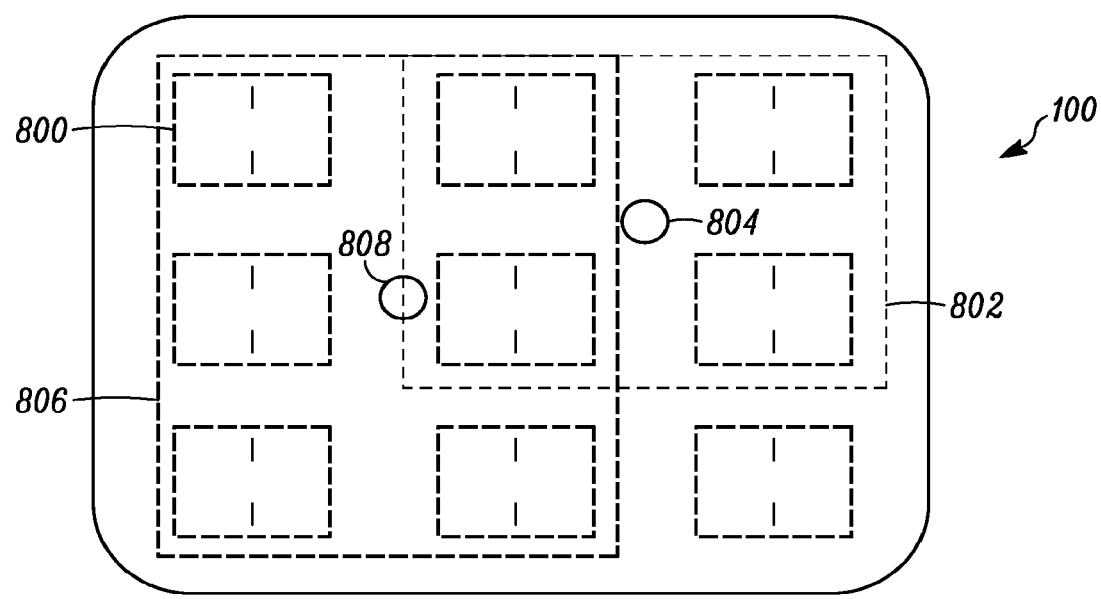

Referring now to FIGS. 7 and 8, an exemplary array of dipole antenna elements are shown. In FIG. 7, the dipole antenna elements 700 are horizontally polarized, while in FIG. 8 the dipole antenna elements 800 are vertically polarized. It will be appreciated that dipole antenna elements 700 and 800 could be mixed into a combined array, if desired, for any particular implementation. In the exemplary embodiment of FIG. 7, a first subset 702 of the horizontally polarized dipole antenna elements 700 are configured in a horizontal rectangular configuration having an antenna beam center 704 in the center of the subset 702. Another subset 706 could also be activated to provide a vertical rectangular configuration of the horizontally polarized dipole antenna elements 700. This subset would shift the beam center as indicated by 708. As noted above, in some transmission and/or reception sessions, not all of the antenna elements 700' need to be activated.

FIG. 8 illustrates that the subsets 802 and 806 of the vertically polarized dipole antenna elements 800 need not have a common configuration. The subset 802 has a square structure with a beam center 804, while the subset 806 has a vertically oriented rectangular configuration with a beam center 808. It will be appreciated that in larger array sizes (e.g., 5×5, 8×8) the activated antenna elements 800 may form array subsets in manifold ways.

Figure 9:
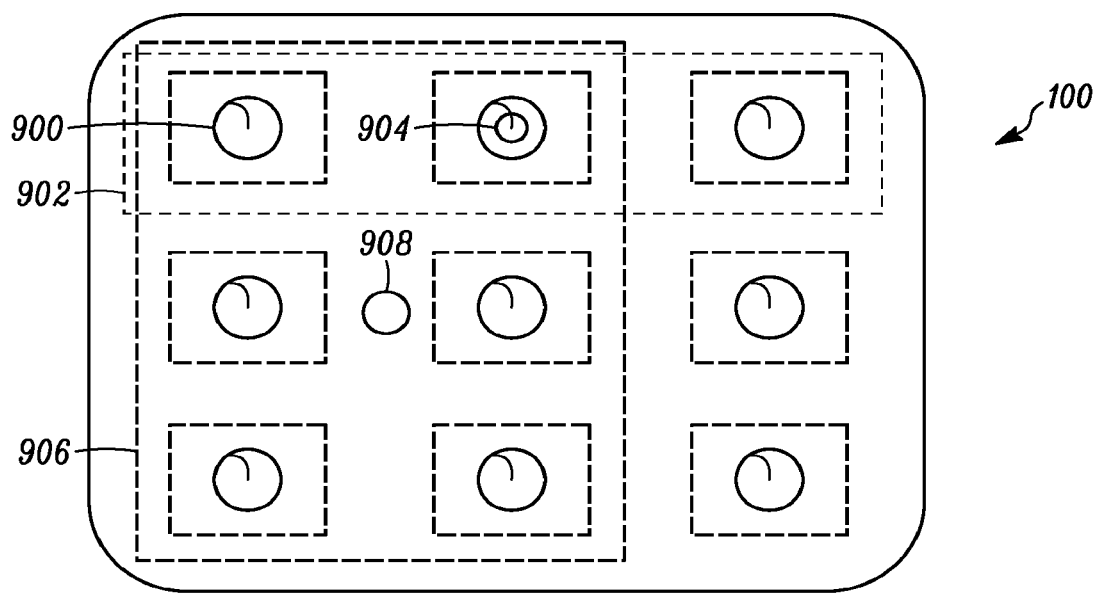

Referring now to FIG. 9, still more subset combination variations of antenna element 900 are illustrated. As can be seen, three helical antenna elements 900 are activated to form a horizontal 1×3 rectangular subset 902 with a beam center, 904. For a subsequent transmission and/or reception session, subset 906 may be employed, which forms a vertically arranged rectangular subset of helical antenna elements 900 having a beam center at 908.

Figure 10:
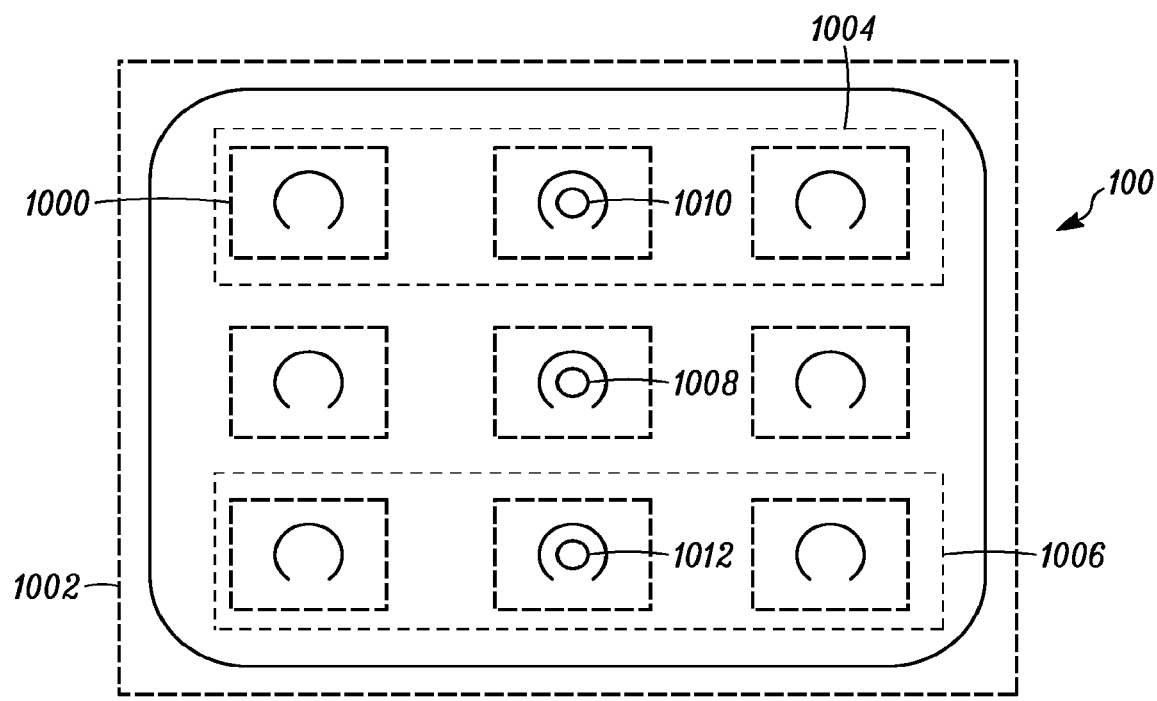

FIG. 10 illustrates the possibility of activating all of the loop antenna elements 1000 as a superset 1002 having a beam center at 1008. In prior or subsequent transmission and/or receptions sessions, 1×3 subsets 1004 and/or 1006 may be used to direct (steer) the beam center between 1010 and 1012, as desired, to communicate with one or more RFID tags (108 in FIG. 1).

Figure 11:
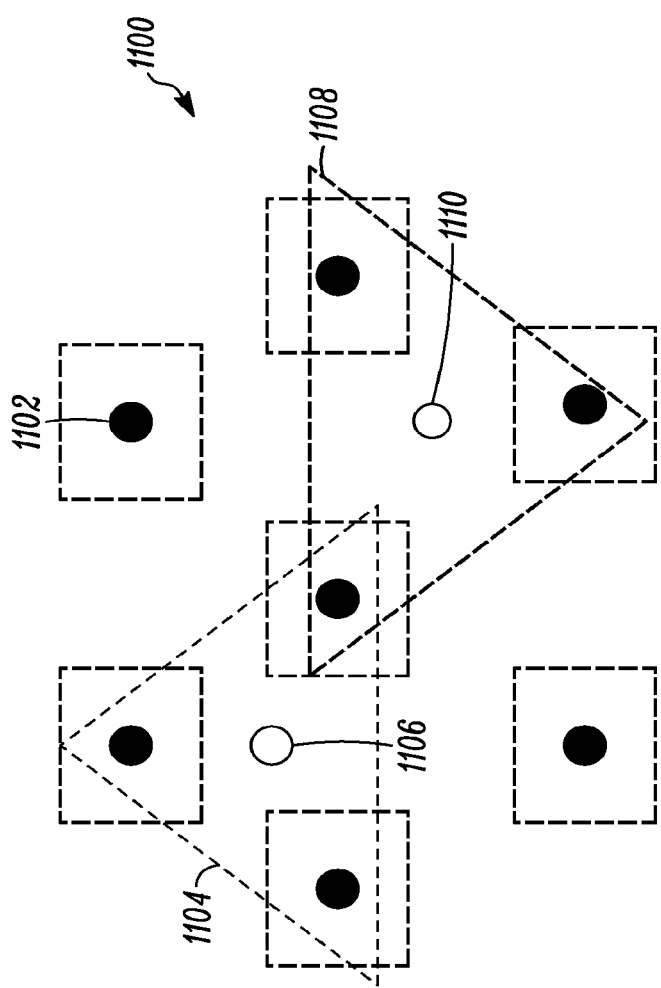

FIG. 11 illustrates still further exemplary embodiments provided in a hexagonal array 1100 formed of monopole antenna elements 1102. A first subset 1104 having a beam center 1106 is configured in a triangular arrangement. A second subset 1108 also has a triangular configuration, but is inverted relative to the first subset 1104, and has a beam center 1110. Again, it will be appreciated that many and varied combinations of antenna elements 1102 may be activated to form a plethora of subsets.

Figure 12:
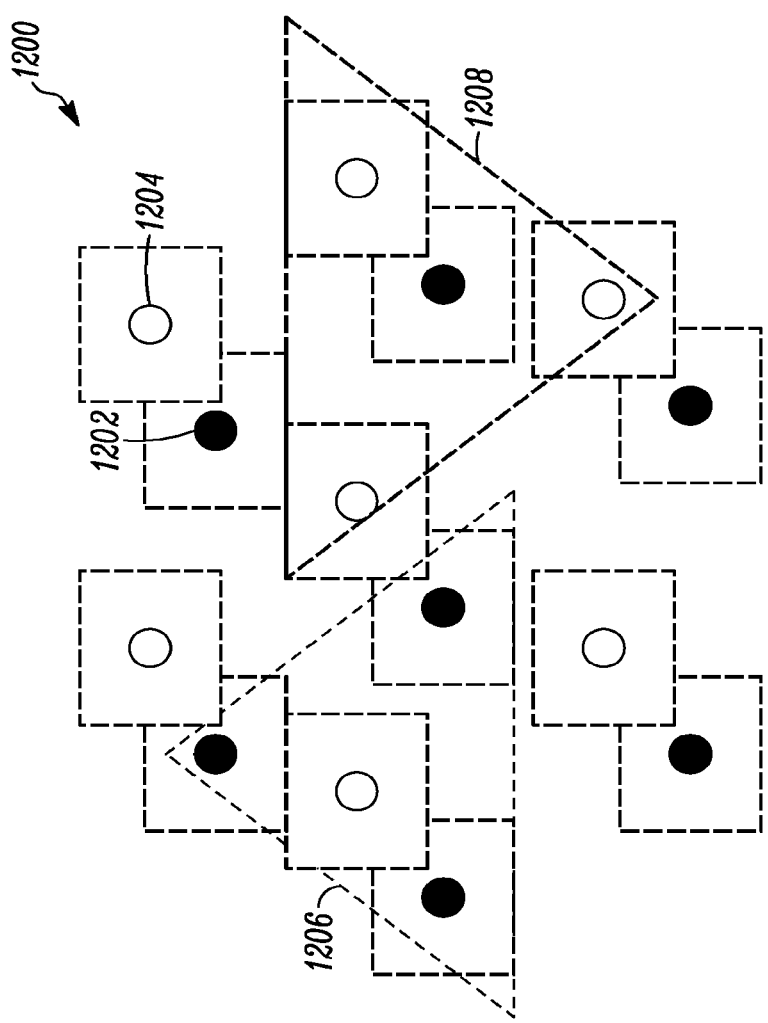

FIG. 12 expands upon FIG. 11 by illustrating a dual-hexagonal array 1200 that includes a hexagonal array of antenna elements 1202 (e.g., monopole elements) having a first polarization (e.g., vertical). Also, a second hexagonal array of antenna elements 1204 (e.g., loop elements) having a second polarization (e.g., horizontal) is positioned interleaved within the hexagonal array of antenna elements 1202. Due to the different polarizations, the hexagonal arrays do not interfere with the operation of each other and may be configured as illustrated in FIG. 12 or in a multitude of other arrangements as will be appreciated. In some embodiments, the subsets of the dual-hexagonal array 1200 may be formed as all of the antenna elements 1202 and all of the antenna elements 1204. In other embodiments, a subset 1206 of the antenna elements 1202 may form one subset, while a subset 1208 of the antenna elements 1204 may form another subset. In still further embodiments, one subset could be formed by all of the antenna elements 1202, while a second subset 1208 of the antenna elements 1204 may form another subset.

Figure 13:
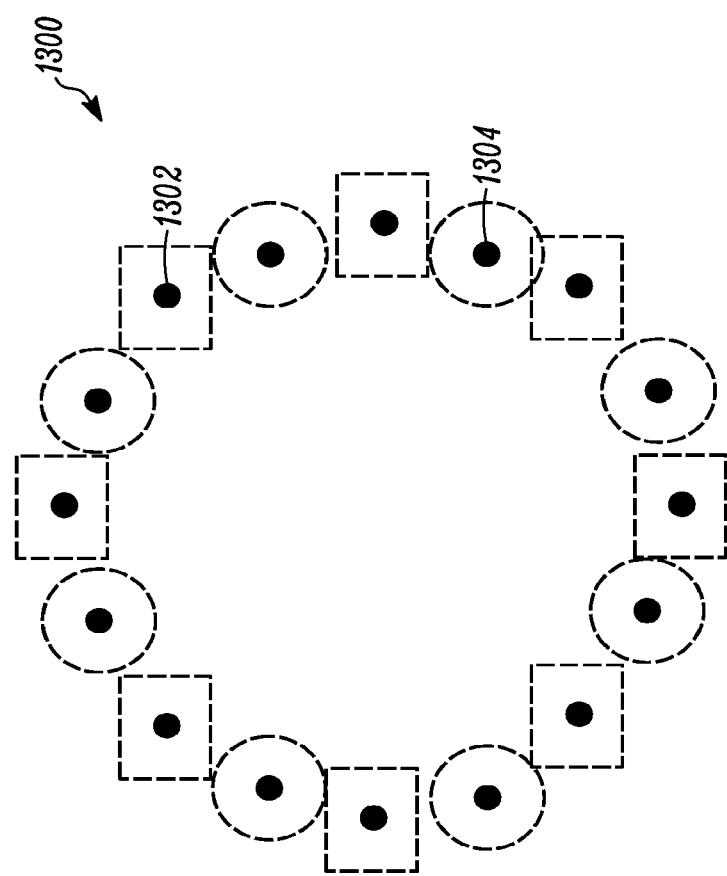

By now it will be appreciated that myriad of antenna elements types may be selectively activated to form a multitude of subsets affording the advantage of directing (steering) an antenna array beam with varying transmission properties and phase shifting the beam center. FIG. 13 illustrates yet another possible implementation of a dual circular array 1300 having subsets formed of antenna elements 1302 and 1304. In a superset configuration, all of the antenna elements 1302 and 1304 could be activated. Additionally or alternately, dual circular subsets could be formed by individually activating the antenna elements 1302 for one transmission and/or reception session, while activating the antenna elements 1304 for another transmission and/or reception session.

Accordingly, techniques have been disclosed for improving RFID coverage using an antenna array having an adaptive antenna beam. The antenna beam is adapted about a monitored area by selectively activating various subsets of antenna elements. The subsets may be configured in manifold ways and provide an antenna beam with changing transmission properties and shifted beam center, and may include a polarization change between selection of the activated antenna element subsets. Naturally, the superset of all of the antenna elements may be employed, if desired, in any particular implementation of the teachings provided by the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A radio frequency identification (RFID) reader, comprising:
   an antenna array including a plurality of antenna elements;
   a transmit/receive module coupled to the plurality of antenna elements; and
   a beam forming processor coupled to the transmit/receive module and configured to selectively activate the plurality of antenna elements in a full set of antenna elements to generate a steerable transmission beam capable of interrogating at least one RFID tag by steering the steerable transmission beam towards a particular area within a monitored region,
   wherein the beam forming processor is further configured to:
      activate a first subset of antenna elements of the full set of antenna elements to transmit a first RFID interrogation signal to interrogate the at least one RFID tag;
      receive, using a second subset of antenna elements of the full set of antenna elements, a first RFID response signal from the at least one RFID tag in response to the first RFID interrogation signal, wherein the second subset of antenna elements is different from the first subset of antenna elements;
      determine a signal quality of the first RFID response signal;
      in response to determining the signal quality of the first RFID response signal: change the antenna elements in the second subset to a third subset of antenna elements of the full set of antenna elements; and
      activate the third subset of antenna elements to transmit a second RFID interrogation signal to again interrogate the at least one RFID tag to receive a second RFID response signal from the at least one RFID tag.

2. The RFID reader of claim 1, wherein the plurality of antenna elements are spaced approximately one-half wavelength apart.

3. The RFID reader of claim 1, further comprising a controller coupled to the beam forming processor.

4. The RFID reader of claim 1, wherein the beam forming processor selectively activates all of the plurality of antenna elements.

5. The RFID reader of claim 1, wherein the plurality of antenna elements comprises one or more antenna types from the following group of antenna types: monopole, dipole, loop, helical and patch.

6. The RFID reader of claim 5, wherein the plurality of antenna elements are polarized with one or more of the following group of antenna polarizations: vertical, horizontal and circular.

7. The RFID reader of claim 1, wherein the first subset and the second subset have a common polarization for the respective transmitting and receiving.

8. The RFID reader of claim 1, wherein the first subset and the second subset have different polarization for the respective transmitting and receiving.

9. The RFID reader of claim 1, wherein the RFID reader and at least one other RFID reader are coupled to a controller configured to control the RFID reader and the at least one other RFID reader.

10. A radio frequency identification (RFID) reader, comprising:
   an antenna array including a plurality of antenna elements;
   a transmit/receive module coupled to the plurality of antenna elements; and
   a beam forming processor coupled to the transmit/receive module and configured to selectively activate the plurality of antenna elements in a full set of antenna elements to generate a steerable antenna beam by steering the steerable antenna beam towards a particular area within a monitored region to receive a signal from at least one RFID tag,
   wherein the beam forming processor is further configured to:
      activate a first subset of antenna elements of the full set of antenna elements to transmit a first RFID interrogation signal to interrogate the at least one RFID tag;
      receive, using a second subset of antenna elements of the full set of antenna elements, a first RFID response signal from the at least one RFID tag in response to the first RFID interrogation signal, wherein the second subset of antenna elements is different from the first subset of antenna elements;
      determine a signal quality of the first RFID response signal;
      in response to determining the signal quality of the first RFID response signal: change the antenna elements in the second subset to a third subset of antenna elements of the full set of antenna elements; and
      activate the third subset of antenna elements to transmit a second RFID interrogation signal to again interrogate the at least one RFID tag to receive a second RFID response signal from the at least one RFID tag.

11. The RFID reader of claim 10, wherein the plurality of antenna elements are spaced approximately one-half wavelength apart.

12. The RFID reader of claim 10, further comprising a controller coupled to the beam forming processor.

13. The RFID reader of claim 10, wherein the plurality of antenna elements comprises one or more antenna types from the following group of antenna types: monopole, dipole, loop, helical and patch.

14. The RFID reader of claim 10, wherein the RFID reader and at least one other RFID reader are coupled to a controller configure to control the RFID reader and the at least one other RFID reader.

15. The RFID reader of claim 10, wherein the first and second subsets have a different polarization.

16. A method, comprising:
  activating a first subset of antenna elements of a plurality of antenna elements forming an antenna array to: generate a steerable antenna beam configured to transmit a first radio frequency identification (RFID) interrogation signal from the first subset of antenna elements, steer the steerable antenna beam towards a particular area within a monitored region, and interrogate at least one RFID tag;
  receiving, using a second subset of antenna elements of the plurality of antenna elements, a first RFID response signal from the at least one RFID tag in response to the first RFID interrogation signal, wherein the second subset of antenna elements is different from the first subset of antenna elements;
  determining a signal quality of the first RFID response signal;
  in response to determining the signal quality of the first RFID response signal:
  changing the antenna elements in the second subset to a third subset of antenna elements of the plurality of antenna element; and
  activating the third subset of antenna elements to transmit a second RFID interrogation signal to again interrogate the at least one RFID tag to receive a second RFID response signal from the at least one RFID tag.

17. The method of claim 16, further comprising receiving the second RFID response signal via activating a different subset of antenna elements than was used to transmit the second RFID interrogation signal.

* * * * *